United States Patent [19]

Pallant

[11] 4,428,553

[45] Jan. 31, 1984

[54] ADJUSTMENT MECHANISM

[75] Inventor: Joseph Pallant, Wolverhampton, England

[73] Assignee: H. R. Turner (Willenhall) Limited, West Midlands, England

[21] Appl. No.: 446,568

[22] Filed: Dec. 3, 1982

Related U.S. Application Data

[63] Continuation of Ser. No. 186,969, Sep. 15, 1980, abandoned.

[30] Foreign Application Priority Data

Sep. 29, 1979 [GB] United Kingdom ............... 7933843
Jan. 31, 1980 [GB] United Kingdom ............... 8003341

[51] Int. Cl.³ .......................................... F16M 11/00
[52] U.S. Cl. .................................. 248/157; 267/131; 297/198
[58] Field of Search ................... 267/36 A, 38, 40, 45, 267/48, 54 B, 54 D, 54 E, 56, 131, 133, 158, 160, 164, 165, 36 R; 248/573, 574, 575, 626, 157; 297/198, 284, 338, 345

[56] References Cited

U.S. PATENT DOCUMENTS

| 649,499 | 5/1900 | Webber | 248/573 |
|---|---|---|---|
| 759,507 | 5/1904 | Ericson et al. | 248/575 |
| 2,308,446 | 1/1943 | Fruehauf | 248/626 |
| 3,083,034 | 3/1963 | Hollowell | 267/56 |
| 4,093,197 | 6/1978 | Carter et al. | 267/131 |

FOREIGN PATENT DOCUMENTS

| 1274003 | 7/1968 | Fed. Rep. of Germany | 297/284 |
|---|---|---|---|
| 1554041 | 1/1970 | Fed. Rep. of Germany | |
| 1580622 | 12/1970 | Fed. Rep. of Germany | |
| 22471 | 7/1921 | France | 267/36 A |
| 668986 | 3/1952 | United Kingdom | 248/626 |
| 1272929 | 5/1972 | United Kingdom | 297/284 |

Primary Examiner—Bruce H. Stoner, Jr.
Assistant Examiner—R. R. Diefendorf
Attorney, Agent, or Firm—C. O. Marshall, Jr.

[57] ABSTRACT

A vehicle seat having a seat base frame (10) mounted on cross rails (12) is provided with a height adjustment mechanism comprising a pair of generally U-shaped leaf springs (14) which constitute the sole support for the seat on the crossrails (12). The leaf springs each have a pair of oppositely inclined upstanding tongues (18) connected to the seat base frame through pin and slot connections (32, 34) and, adjacent their upper ends, each pair of tongues (18) is connected by a rod (37) which serves both to stiffen the tongues (18) and also to effect adjustment of their inclination so as to vary the height of the seat base (10) above the rails (12).

2 Claims, 5 Drawing Figures

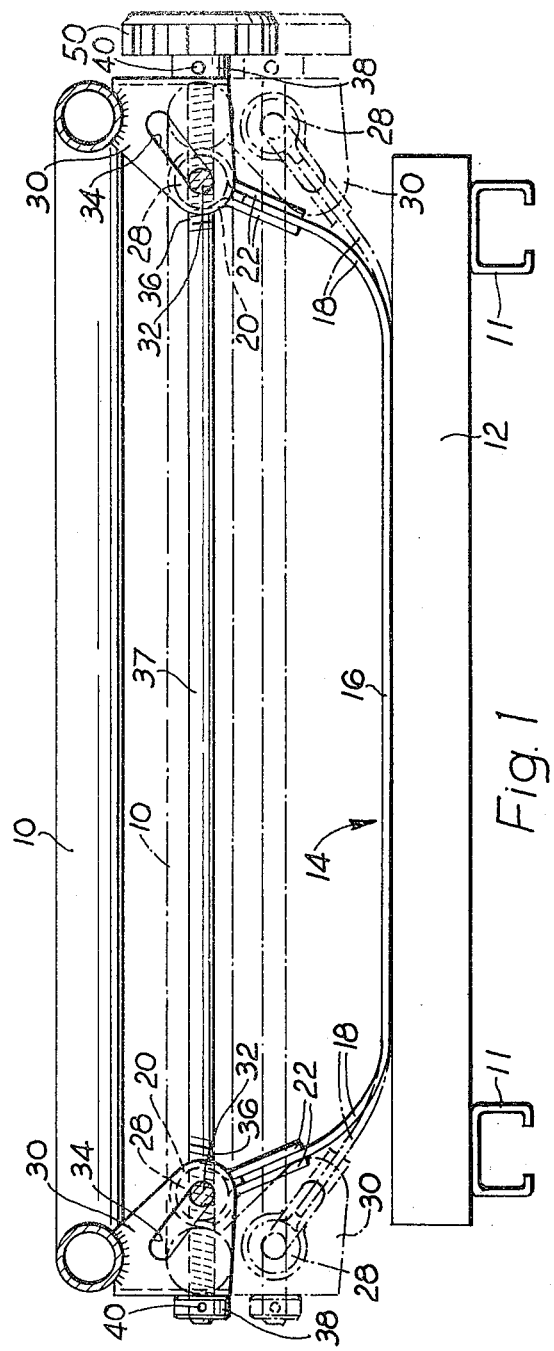
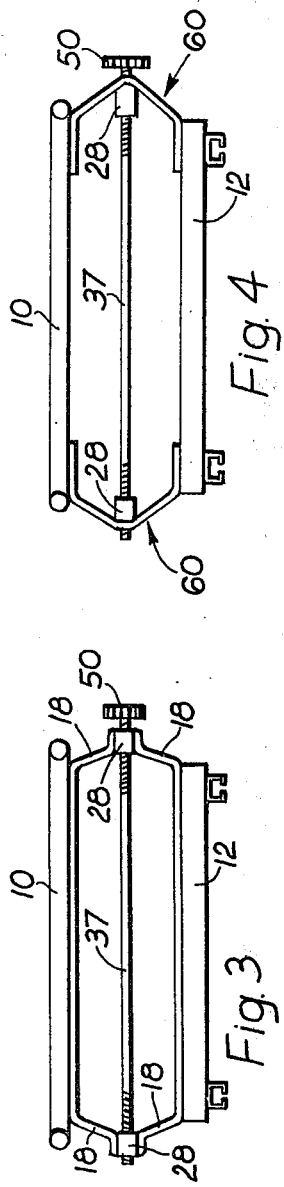

ADJUSTMENT MECHANISM

This is a continuation of application Ser. No. 186,969, filed Sept. 15, 1980 and now abandoned.

BACKGROUND OF THE INVENTION

This invention relates to an adjustment mechanism which is particularly but not necessarily exclusively intended for use in adjusting the height of a vehicle seat relative to the vehicle.

Various forms of vehicle seat height adjustment mechanism are currently available and, in general, these comprise lever type arrangements in which angular adjustments of the levers or links result in raising and lowering of the seat (relative to the vehicle floor), the seat base usually being mounted on a seat slide structure via the lever or linkage arrangement so that fore-and-aft adjustments of the seat can be effected as well as height adjustments. The angular adjustments of the levers or links are effected by means of one or more user controllable actuators and to assist raising movements, which involve lifting the weight of the seat and its occupant, the general practice is to provide spring assisters which bias the seat upwardly against the weight of seat and occupant.

SUMMARY OF THE INVENTION

The object of the present invention is to provide an adjustment mechanism which when embodied in for example a vehicle seat as a height adjustment mechanism represents a considerable simplification of the type of height adjustment mechanism that has been employed hitherto.

According to one aspect of the present invention we provide an adjustment mechanism in which at least one spring element serves to space apart a pair of members and means is provided to controllably adjust the degree of deflection of the or each spring element and thereby adjust the spacing between said members.

Thus, in accordance with the invention, the or each spring element not only serves to provide a biasing force acting between said members but is also instrumental in varying the spacing between said members thereby obviating the need for separate linkages.

According to a second aspect of the invention we provide an adjustment mechanism comprising a pair of members spaced apart by at least one spring element such that the spacing between said members varies in dependence upon the degree of deflection of the or each spring element, and means for controllably adjusting the deflection of the or each spring element, said control means being effective to stiffen the or each spring element so as to resist spring deflections due to external forces tending to vary the spacing between said members.

Preferably the or each spring element is of the kind which provides its biasing force in response to bending, e.g. a leaf type spring which may be in the form of a strip, bar or rod, the or each spring element being arranged so as to extend transversely between said members so that bending deflections thereof vary its angle of inclination relative to said members thereby further separating said members or bringing them towards one another.

Preferably at least one pair of spring elements is provided and conveniently the spring elements of each such pair are arranged so that they are oppositely inclined, said control means comprising an adjustable coupling element connecting the two spring elements together at positions intermediate said members in such a way that adjustment of said coupling elements bends said spring elements towards or away from each other, said coupling element being rigid in tension and/or compression so as to stiffen said spring elements against bending away and/or towards each other in response to external forces which tend to displace said members towards and/or away from each other.

The spring elements of each pair may be separate from one another or they may be integrally united with each other in which case they may be constituted by the upturned end portions of a generally U-shaped springy metal strip, bar or rod.

The coupling element may be of adjustable longitudinal extent or it may be provided with portions which can be adjusted longitudinally, preferably in response to rotation of said coupling element, said potions being engaged with respective spring elements. In one preferred embodiment, the coupling element comprises a rotatable rigid spindle having a knob or the like for manipulation by the user and opposite handed screw threads at opposite end portions thereof engaged by components to which said spring elements are connected whereby rotation of the spindle causes said components to move towards or away from one another with consequent bending of said spring elements.

Preferably means are provided for ensuring that the spring elements undergo substantially equal bending deflections for a given adjustment of said coupling element. In the preferred embodiment, such means may comprise constraints for preventing longitudinal movement of the spindle relative to at least one of said spaced members.

Conveniently stop means are provided to limit bending deflection of the or each spring element and the or each spring element may be preformed so that it is unstressed or stressed to a minimum extent when said members are at one extreme position of spacing and so that it is progressively stressed up to maximum extent as said members move towards the opposite extreme spacing in response to deflection of the or each spring element. Thus, where the adjustment mechanism is embodied in a vehicle seat height adjustment device, the unstressed or minimum stress condition of the or each spring element conveniently corresponds to the maximum spacing between said members (which, in this event, will be connected one to the seat base and the one to the vehicle floor or slide structure). In this way, the spring elements serve to assist raising movement of the seat.

One possible drawback that may arise when the adjustment mechanism described thus far is used as a vehicle seat height adjuster is the need to employ relatively stiff leaf springs in order to counteract any tendency for the seat to tilt side to side when loaded off-centre, e.g. in response to the seat occupant shifting his centre of gravity. However, relatively stiff leaf springs result in an increase in the manual effort needed to operate the adjustment knob.

A further object of the present invention is to enable a less stiff spring to be used without the attendant disadvantage of increased tendency for the seat to tilt in the above manner.

According to the present invention we provide an adjustment mechanism comprising a pair of members whose relative spacing is to be adjusted and at least one pair of spring elements which space said members apart, the spring elements being oppositely inclined and means being provided to controllably adjust the degree of deflection of both spring elements of each pair and thereby adjust the spacing between said members, characterised in that the spring elements of the or each pair are coupled together in such a way that when one spring element undergoes deflection independently of said control means the force responsible for such deflection is transmitted by the coupling means to the other spring element to cause the latter to deflect in the same manner.

Thus, when for example a vehicle seat supported by the above defined mechanism is loaded unevenly so that the load acting above one spring element is greater than that acting above the other, said coupling means tends to distribute the load so that both spring elements tend to depress.

In the presently preferred embodiment of the invention said coupling means comprises, for each spring element pair, a pair of two armed levers associated one with each spring element, each lever being pivotally mounted on one of said members and having one arm connected to the associated spring element, the second arms of the levers being coupled together. Thus, as one lever pivots say counterclockwise in response to deflection of the associated spring element, the other lever is caused to pivot clockwise or by tending to deflect its associated spring element in the same manner.

It is envisaged that the lever arrangement employed in the preferred embodiment may be used as a height adjustment mechanism in its own right, i.e. without the need for any spring elements as aforesaid. Thus, according to a second aspect of the present invention we provide an adjustment mechanism comprising a pair of members whose relative spacing is to be adjusted, at least one pair of two armed levers each pivotally mounted on one of said members, means coupling the first arms of said levers together, the second arms of said levers being connected to said second member, and control means for pivoting said levers in unison to vary the spacing between said members.

BRIEF DESCRIPTION OF THE DRAWINGS

FIG. 1 is a front elevation of a vehicle seat incorporating a seat height adjustment mechanism;

FIG. 3 is a schematic diagram showing an alternative form of adjustment mechanism;

FIG. 4 is a diagrammatic view of another alternative form of the adjustment mechanism.

DESCRIPTION OF THE PREFERRED EMBODIMENTS

Figure 2:
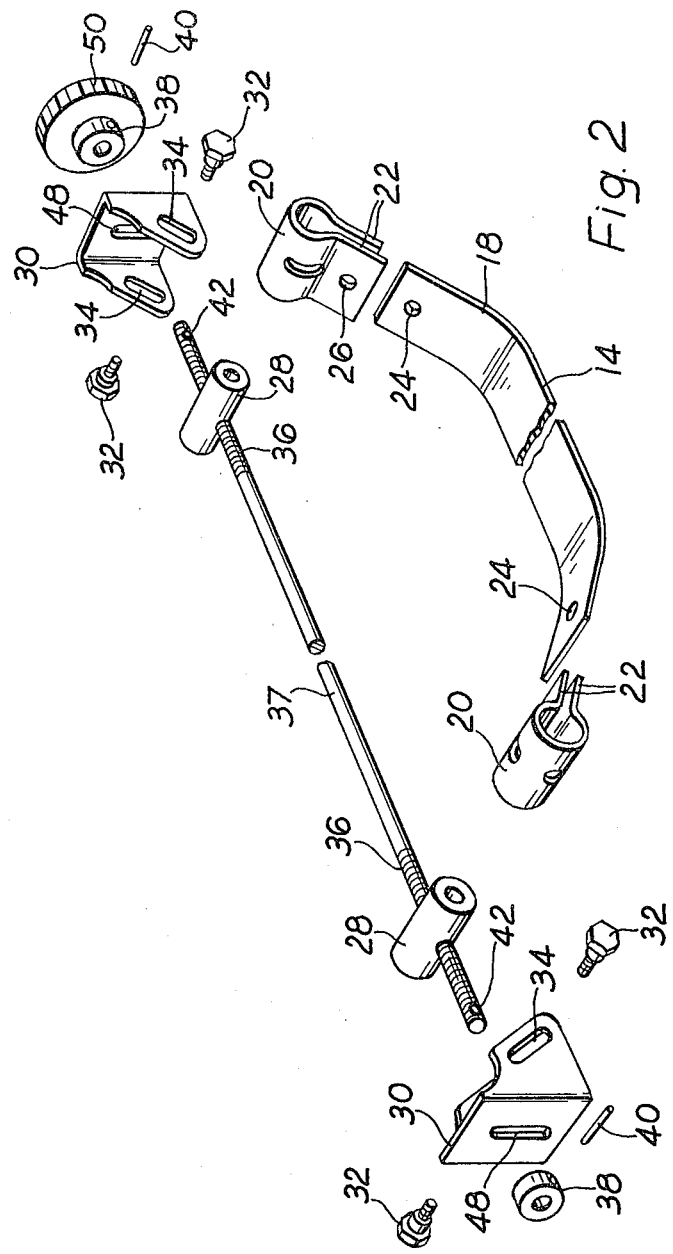
FIG. 2 is an exploded perspective view of part of the adjustment mechanism.

Referring now to FIGS. 1 and 2, a seat height adjustment mechanism is shown for adjusting the height of a seat base 10 (only part of which is shown) relative to the vehicle floor structure or a seat slide structure. In the following description, it will be assumed that the seat is mounted for fore-and-aft adjustment on a seat slide structure, the slides 11 of which are bridged by a pair of cross members 12 (one only which is shown) located towards the front and rear respectively beneath the seat base 10. The seat slide structure may be of conventional design and for this reason it will not be described further.

The seat base 10 is supported on the cross members 12 through the agency of a pair of leaf-type springs 14 each of which is generally U-shaped comprising a straight base 16 which is secured to a respective cross-member 12 and upwardly and obliquely projecting tongues 18. The leaf springs 14 constitute the sole support for the seat base. Each of the springs may be formed from a strip of springy metal so that the tongues 18 can be resiliently deflected downwardly from the solid line position shown in FIG. 1 towards the position shown in broken outline.

At the free end thereof, each tongue 18 has a sleeve 20 clamped thereto, the sleeve 20 being provided with flanges 22 between which the tongue 18 can be clamped by means of a rivet or other fastener (not shown) inserted through aligned holes 24, 26. Each sleeve 20 rotatably journals a cylindrical block 28 whose axis extends generally parallel to the axes about which the tongues 18 are intended to bend. The blocks 28 are slidably coupled to the seat base 10 by brackets 30 which have pin and slot connections 32, 34 with the blocks 28, each slot 34 being upwardly inclined away from the medial axis of the seat. The brackets 30 are shown as being welded to the seat base frame; however in a modification they may be pivotally connected to the seat base frame for limited angular movement about a transverse axis so as to compensate for any twisting in the leaf springs that might otherwise occur when one end of the seat is raised higher than the other. Although shown inclined the slots 34 may be generally horizontal.

The blocks 28 are each formed with an internally threaded diametral throughbore by means of which they are engaged with screw-threaded end portions 36 of an actuating rod 37 which is held axially captive by collars 38 pinned to the ends of the rod 37 by pins 40 engaging in holes 42 so that the collars 38 abut against brackets 30.

The end walls of brackets 30 are formed with vertical slots 48 to allow vertical movement of the rod 37 relative to the seat base 10. One of the collars 38 is formed as part of a handle or knob 50 which enables the rod 37 to be rotated about its longitudinal axis. The screw threaded portions 36 are oppositely handed so that, in response to rotation of the rod 37, the blocks 28 move towards or away from one another depending on the direction of rotation. Because the tongue 18 of each leaf spring are inclined in opposite directions, it will be seen that rotation of the rod 37 and hence displacement of the blocks 28 will cause the associated tongues 18 to bend towards or away from one another and seat base 10 will rise or fall relative to the cross members 12. It will be observed that the rod 37 acts as a rigid connection between the tongues 18 and thereby stiffens them against deflection so that, contrary to what might be expected, the seat does not tend to bounce when the occupant seats himself or gets out of the seat. The rod therefore controls the tongues 18 so that, for all practical purposes, they act as substantially rigid connections between the members 10, 12.

In the illustrated embodiment where two leaf springs 14 are employed, one adjacent the front end and the other adjacent the rear end of the seat, two handles or knobs 50 may be provided so that the front end of the seat can be raised or lowered independently of the rear end or vice versa, thereby allowing the attitude of the seat to be varied. In an alternative embodiment, the handle or knob may be provided on only one of the rods 37 and there may be a drive transmission between the two rods so that both rods rotate in response to turning of the knob. The drive transmission in this case may be operable selectively so that, in one mode of operation, both rods rotate but, in a second mode of operation, only the rod provided with the knob rotates. In this way, raising or lowering of the seat base can be effected in said first mode and changes in the attitude, i.e. tilted angle, of the seat can be effected in the second mode. Also, in some circumstances, the heightwise adjustment may be confined to one end only (e.g. the front end) of the seat. In this event, only one leaf spring 14 need be used and the other end of the seat can be supported at a fixed height via pivots.

It will be noted that the slots 34 define the limits of heightwise adjustment. In order that the springs will assist seat raising against the weight of seat and occupant, the arrangement is conveniently such that the tongues 18 are unstressed or relatively unstressed when the pins 32 are located at the lower ends of the slots 34 and become increasingly stressed as the pins 32 move towards the upper ends of the slots 34.

Various other modifications over and above those already described are possible: for example, instead of the tongues being integrally united with each other, they may be separate; instead of the leaf springs extending transversely of the seat, they may extend for-and-aft beneath opposite sides of the seat; and alternative forms of spring deflecting devices can be employed and such devices need not necessarily link two springs or other elements (as in FIGS. 1 and 2) instead such devices may act between each spring tongue or other elements and the member to which the spring tongue or element is rigidly secured.

FIGS. 3 and 4 show diagrammatically further modifications. In FIG. 3, two leaf springs of the form shown in FIGS. 1 and 2 are superimposed. In FIG. 4, the spring elements 60 are generally C-shaped and their ends are rigidly secured to the members 10, 12 respectively. Deflection of the spring 60 may be effected by a similar device to that shown in FIGS. 1 and 2, arranged to cooperate with the mid-portions of the springs.

Figure 5:
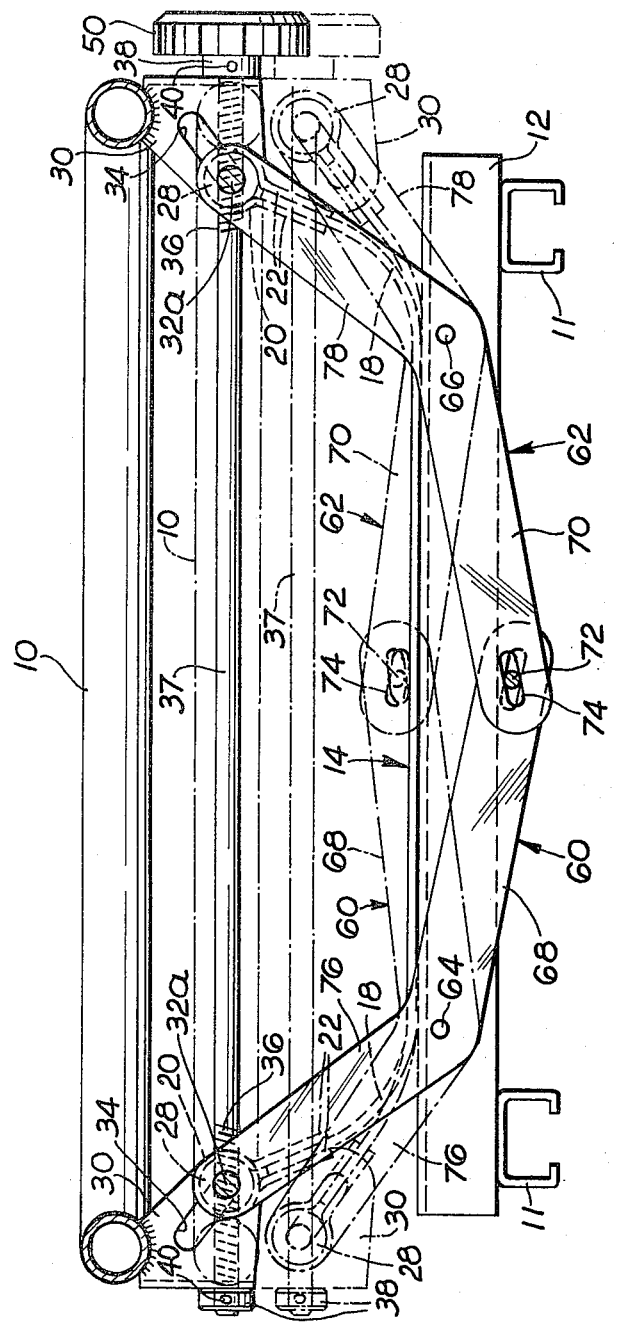
FIG. 5 is a similar view to FIG. 1 but showing a modification.

The embodiment shown in FIG. 5 of the drawings is for the most part the same as the embodiment of FIGS. 1 and 2. The following description is therefore confined to the differences between the two embodiments.

Each leaf spring 14 has a pair of two armed levers 60, 62 associated with it. These levers are pivoted at 64, 66 to cross member 12 and have arms 68, 70 thereof coupled together by a sliding bolt 72 received in slot 74.

The other arms 76, 78 are pivotally connected to the blocks 28 by pins 32a which pass through the slots 34. It will be understood that when for example the left hand tongue 18 in FIG. 5 is depressed by an off centre load, the lever 60 tends to pivot counterclockwise causing lever 62 to pivot clockwise with a corresponding depression of the right hand tongue 18. Thus, the tendency for the seat to tilt in response to off centre loads is greatly reduced.

The arrangement of the levers 60, 62 is such that they may be used to effect height adjustments in their own right which means that the leaf springs 14 and spindle 37 may be omitted in this case. In such an arrangement, user controllable means may be provided to effect pivoting of the levers 60, 62 in unison whereby the seat base is raised and lowered via the blocks 28 and brackets 30. The control means in this embodiment may for example include a spindle having opposite handed screwthreaded portions engaging in corresponding female parts on the levers 60, 62 so that turning of the spindle in one sense raises the seat base and turning in the opposite sense lowers the seat base.

I claim:

1. A vertically adjustable seat structure comprising a rigid seat frame, a rigid support frame, and means for mounting the seat frame on the support frame which prevents the seat from bouncing up and down and which provides vertical adjustment of the seat frame relative to the support frame, said means including
   (a) a resiliently flexible element having two end portions which are oppositely inclined relative to one another, said element being fixed to one of said frames, and the ends of said inclined portions being supportingly connected to the other of said frames,
   (b) a strut which rigidly connects the ends of said inclined portions to space said ends a fixed distance apart, and
   (c) means for adjusting the effective length of said strut, thus varying the inclination of said portions by flexing said portions and thereby adjusting the seat frame vertically relative to the support frame,
   (d) said portions being connected also by a linkage which transmits bending deflection of each portion to the other portion to cause them to bend oppositely to one another in unison.

2. A seat structure as claimed in claim 1 in which said linkage comprises a pair of two-armed levers, each of which is pivoted on one of said frames and has one arm connected to one of said inclined portions the second arms of said levers being coupled together.

* * * * *